United States Patent
Zimmer et al.

(10) Patent No.: US 10,663,338 B2
(45) Date of Patent: May 26, 2020

(54) DIFFERENTIAL FLOWMETER TOOL

(71) Applicant: Micro Motion, Inc., Boulder, CO (US)

(72) Inventors: Patrick John Zimmer, Denver, CO (US); Steven M Jones, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 408 days.

(21) Appl. No.: 15/501,759

(22) PCT Filed: Sep. 4, 2014

(86) PCT No.: PCT/US2014/054120
§ 371 (c)(1),
(2) Date: Feb. 3, 2017

(87) PCT Pub. No.: WO2016/036375
PCT Pub. Date: Mar. 10, 2016

(65) Prior Publication Data
US 2017/0227390 A1     Aug. 10, 2017

(51) Int. Cl.
*G01F 15/02* (2006.01)
*G01F 1/84* (2006.01)

(52) U.S. Cl.
CPC .......... *G01F 15/024* (2013.01); *G01F 1/8436* (2013.01)

(58) Field of Classification Search
None
See application file for complete search history.

(56) References Cited

U.S. PATENT DOCUMENTS 4,308,754 A * 1/1982 Pedersen ................. G01P 5/247
702/48

4,612,804 A     9/1986 Colonnello
(Continued)

FOREIGN PATENT DOCUMENTS

| CA | 2766419 A1 * | 1/2011 | ............... G01F 1/74 |
| CA | 2960119 A1 * | 3/2016 | ........... G01F 1/8436 |

(Continued)

OTHER PUBLICATIONS

"Guide to the Evaluation of Measurement Uncertainty for Quantitative Test Results", Jan. 1, 2006 (Jan. 1, 2006), XP055145433, Retrieved from the Internet <URL:http://www.eurolab.org/documents/EL_11_01_06_387 Technical report—Guide Measurement uncertainty.pdf> (Year: 2006).*

(Continued)

*Primary Examiner* — Janet L Suglo
*Assistant Examiner* — Leonard S Liang
(74) *Attorney, Agent, or Firm* — The Ollila Law Group LLC

(57) ABSTRACT

A method for determining system accuracy is provided. The method includes the steps of inputting hardware specifications related to a supply flowmeter into a computing device and inputting hardware specifications related to a return flowmeter into the computing device. Additionally, the method includes inputting system parameters into the computing device. System accuracy is calculated with system logic, wherein the system logic receives the inputs based on hardware specifications related to the supply flowmeter, the hardware specifications related to the return flowmeter, and the system parameters. The calculated system accuracy is stored in a computer-readable storage media, and the calculated system accuracy is output.

21 Claims, 6 Drawing Sheets

(56) References Cited

U.S. PATENT DOCUMENTS

| | | | | |
|---|---|---|---|---|
| 4,718,443 A * | 1/1988 | Adney | G01F 3/36 | 137/486 |
| 5,285,673 A | 2/1994 | Drexel et al. | | |
| 5,710,370 A | 1/1998 | Shanahan et al. | | |
| 5,753,824 A * | 5/1998 | Fletcher-Haynes | G01F 1/667 | 702/48 |
| 6,158,288 A * | 12/2000 | Smith | G01F 1/667 | 73/861.25 |
| 6,301,958 B1 | 10/2001 | Grabher et al. | | |
| 6,311,136 B1 * | 10/2001 | Henry | G01F 1/8404 | 702/45 |
| 6,360,579 B1 * | 3/2002 | De Boom | G01F 25/003 | 73/1.35 |
| 6,381,549 B1 * | 4/2002 | Smith | G01F 1/667 | 702/54 |
| 6,612,186 B1 * | 9/2003 | Patten | G01F 1/84 | 73/861 |
| 6,796,173 B1 | 9/2004 | Lajoie et al. | | |
| 8,695,440 B2 * | 4/2014 | Hays | G01F 1/8431 | 73/861.357 |
| 8,720,281 B2 * | 5/2014 | Hays | G01F 1/8436 | 73/861.357 |
| 9,347,310 B2 * | 5/2016 | Unalmis | G01F 1/74 | |
| 2001/0045134 A1 * | 11/2001 | Henry | G01F 1/74 | 73/861.356 |
| 2002/0129661 A1 * | 9/2002 | Clarke | G01F 1/329 | 73/861.22 |
| 2002/0138221 A1 * | 9/2002 | Borzsonyi | G01F 1/36 | 702/100 |
| 2003/0212509 A1 * | 11/2003 | Henry | G01F 1/8427 | 702/45 |
| 2004/0200259 A1 * | 10/2004 | Mattar | G01F 1/74 | 73/1.34 |
| 2004/0216509 A1 * | 11/2004 | Antonijevic | G01F 1/8472 | 73/1.16 |
| 2005/0066744 A1 * | 3/2005 | Kupnik | G01F 1/662 | 73/861.03 |
| 2005/0193832 A1 * | 9/2005 | Tombs | G01F 1/74 | 73/861 |
| 2005/0284237 A1 * | 12/2005 | Henry | G01F 1/74 | 73/861.356 |
| 2007/0119263 A1 * | 5/2007 | Henry | G01F 1/74 | 73/861.356 |
| 2007/0271043 A1 * | 11/2007 | Ellender | G01F 1/363 | 702/45 |
| 2008/0034890 A1 * | 2/2008 | Barua | G01F 1/8436 | 73/861.354 |
| 2008/0034892 A1 * | 2/2008 | Tombs | G01F 1/74 | 73/861.356 |
| 2009/0019914 A1 * | 1/2009 | Winchester | G01F 25/003 | 73/1.19 |
| 2009/0019947 A1 * | 1/2009 | Henry | G01F 1/74 | 73/861.356 |
| 2009/0044599 A1 | 2/2009 | Owen | | |
| 2011/0035166 A1 * | 2/2011 | Henry | G01F 1/8431 | 702/48 |
| 2011/0264385 A1 * | 10/2011 | Weinstein | G01F 1/8436 | 702/48 |
| 2012/0096923 A1 * | 4/2012 | Weinstein | G01F 1/74 | 73/19.03 |
| 2012/0125123 A1 * | 5/2012 | Hays | G01F 1/8431 | 73/861.357 |
| 2012/0125124 A1 * | 5/2012 | Hays | G01F 1/8436 | 73/861.357 |
| 2012/0160036 A1 * | 6/2012 | Henry | G01F 1/8404 | 73/861.356 |
| 2013/0125612 A1 * | 5/2013 | Hays | G01F 1/8477 | 73/1.16 |
| 2014/0044568 A1 * | 2/2014 | Fouillet | F04B 43/046 | 417/63 |
| 2014/0060206 A1 * | 3/2014 | Fouillet | G01F 1/38 | 73/861.52 |
| 2014/0137642 A1 * | 5/2014 | Henry | E21B 21/063 | 73/152.29 |
| 2014/0137643 A1 * | 5/2014 | Henry | E21B 21/063 | 73/152.31 |
| 2017/0131128 A1 * | 5/2017 | Zimmer | G01F 1/8436 | |

FOREIGN PATENT DOCUMENTS

| | | | | |
|---|---|---|---|---|
| CA | 2961717 A1 * | 3/2016 | | F02D 41/22 |
| EP | 2487467 A1 * | 8/2012 | | G01F 1/74 |
| EP | 2538194 A1 | 12/2012 | | |
| JP | 04052518 A * | 2/1992 | | |
| WO | 1998043051 A2 | 10/1998 | | |
| WO | 2000014484 A2 | 3/2000 | | |
| WO | 0058696 A1 | 10/2000 | | |
| WO | 2000058696 A1 | 10/2000 | | |
| WO | WO-0058696 A1 * | 10/2000 | | G01F 25/003 |
| WO | 2007137222 A2 | 11/2007 | | |
| WO | WO-2009051588 A1 * | 4/2009 | | G01F 1/8477 |
| WO | 2010120245 A1 | 10/2010 | | |
| WO | 2013006171 A1 | 1/2013 | | |

OTHER PUBLICATIONS

"Mesure et incertitudes", May 1, 2012 (May 1, 2012), XP055145679, Retrieved from the Internet <URL:http://media.eduscol.education.fr/file/Mathematiques/07/0/LyceeGT_ressources_MathPC_Mesure_et_incertitudes_eduscol_214070.pdf> (Year: 2012).*

Machine Translation for JP04052518A (Year: 1992).*

EIC 2800 STIC Search Report (Year: 2020).*

"UncertaintyAnalyzer Program Features", Sep. 2, 2014 (Sep. 2, 2014), XP055145511, Retrieved from the internet: URL:http://www.isgmax.com/unc_features.htm [retrieved on Oct. 9, 2014] the whole document.

Lu Qirong et al., Realization of Uncertainty Evaluation System Based on LabVIEW, Journal of Guilin University of Technology, vol. 27, No. 4, pp. 584-588, published on Nov. 30, 2007, China Academic Journal Electronic Publishing House, http://www.cnki.net.

Li Jiang et al., Analysis on Factors Affecting the Certainty of Coriolis Mass Flowmeter in Gas Measurement, Metering Device and Application, supplement vol. 2, 2010, pp. 265-266 and p. 324, published on Dec. 31, 2010, China Academic Journal Electronic Publishing House, http://www.cnki.net.

Xing Jianwen et al., The Influence Factors of Mass Flowmeter Metering Accuracy, China Instrumentation, No. 9, pp. 49-51, published on Dec. 31, 2013, http://www.cnim.cn, China Academic Journal Electronic Publishing House, http://www.cnki.net.

* cited by examiner

DIFFERENTIAL FLOWMETER TOOL

TECHNICAL FIELD

The present invention relates to flowmeters, and more particularly to a tool for determining optimal operating parameters for a differential flowmeter system.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

In certain situations, it is desirable to incorporate multiple flowmeters in a single system. In one such multi-flowmeter example, two flowmeters may be employed in large engine fuel systems. Such systems are commonly found in large seafaring vessels. For such vessels, proper fuel management is critical for efficient engine system operation. To accurately measure fuel consumption, a flowmeter is placed upstream of the engine and another flowmeter is placed downstream of the engine. The differential reading between the two flowmeters is used to calculate the mass of fuel consumed.

A flowmeter of a given size requires a certain fluid flow range to maintain accuracy. On the other hand, a given system may have a range of fluid flow requirements, thus necessitating a flowmeter that does not unduly restrict the system's operation. The best flowmeter for a particular system is therefore one that measures flow and related parameters accurately, yet does not restrict flow or introduce burdensome pressure drops. When two flowmeters are in a single system, flow restriction and accuracy issues are magnified. For example, a pair of flowmeters having 0.1% accuracy errors, when placed in series may not simply add up to be a 0.2% error, but may be far larger. Temperature differentials and zero-stability differentials between two or more flowmeters also contribute to lower system accuracy.

Therefore, there is a need in the art for a method and related system to calculate the most appropriate sizes and types of flowmeters in multi-flowmeter systems based upon a set of given operating constraints. There is a need for a method and related system to determine multi-flowmeter system accuracy. There is a need for a method and related system to determine particular flowmeter models from a library of candidate flowmeters in light of project requirements. The present invention overcomes these and other problems and an advance in the art is achieved.

SUMMARY OF THE INVENTION

A method for determining system accuracy is provided according to an embodiment. The embodiment comprises the steps of inputting hardware specifications related to a supply flowmeter into a computing device and inputting hardware specifications related to a return flowmeter into the computing device. System parameters are inputted into the computing device. A system accuracy is calculated with a system logic, wherein the system logic receives the inputs based on hardware specifications related to the supply flowmeter, the hardware specifications related to the return flowmeter, and the system parameters. The calculated system accuracy is stored in a computer-readable storage media, and the calculated system accuracy is outputted.

A system for configuring a metering system is provided according to an embodiment. According to the embodiment, the system comprises at least two flowmeters and a computing device configured to receive at least one input and to generate at least one output, wherein the at least one input comprises at least one flowmeter hardware specification and at least one system parameter. The system also comprises system logic with the computing device configured to calculate the at least one output, wherein the at least one output comprises at least one of a system accuracy and a temperature-corrected system accuracy.

ASPECTS

According to an aspect, a method for determining system accuracy, comprising the steps of: inputting hardware specifications related to a supply flowmeter into a computing device; inputting hardware specifications related to a return flowmeter into the computing device; inputting system parameters into the computing device; calculating a system accuracy with a system logic, wherein the system logic receives the inputs based on hardware specifications related to the supply flowmeter, the hardware specifications related to the return flowmeter, and the system parameters; storing the calculated system accuracy in a computer-readable storage media; and outputting the calculated system accuracy.

Preferably, the hardware specifications related to the supply flowmeter and the return flowmeter each comprise a base accuracy value.

Preferably, the hardware specifications related to the supply flowmeter and the return flowmeter each comprise a zero offset value.

Preferably, the hardware specifications related to the supply flowmeter and the return flowmeter each comprise a temperature drift value.

Preferably, the hardware specifications related to the supply flowmeter and the return flowmeter each comprise a maximum flow rate value.

Preferably, the system parameters comprise a zero calibration temperature value.

Preferably, the system parameters comprise a fluid density.

Preferably, the system parameters comprise an inlet temperature and an outlet temperature.

Preferably, the step of calculating a system accuracy with a system logic comprises the steps of:

calculating a supply flowmeter uncertainty, $U_S$, wherein $U_S = T_{D_S} m_{max_S} |(T_{inlet} - T_0)| + S_{0_S} + (A_S C_S)$, wherein:
$T_{D_S}$ is a temperature drift of supply flowmeter;
$m_{max_S}$ is a maximum supply flowmeter flow rate;
$T_{inlet}$ is an inlet temperature;
$T_0$ is a zero calibration temperature;
$S_{0_S}$ is a zero offset of supply flowmeter;
$A_S$ is a base accuracy of supply flowmeter; and
$C_S$ is a supply flow rate conversion factor;

calculating a return flowmeter uncertainty, $U_R$, wherein $U_R = T_{D_R} m_{max_R} |(T_{outlet} - T_0)| + S_{0_R} + (A_R C_R)$, wherein:
$T_{D_R}$ is a temperature drift of return flowmeter;
$m_{max_R}$ is a maximum return flowmeter flow rate;
$T_{outlet}$ is an outlet temperature;
$T_0$ is a zero calibration temperature;
$S_{0_R}$ is a zero offset of return flowmeter;
$A_R$ is a base accuracy of return flowmeter; and
$C_R$ is a return flow rate conversion factor.

Preferably, the step of calculating a system accuracy with a system logic comprises the step of calculating a total differential measurement accuracy, $A_{Factory\ Zero}$, wherein $A_{Factory\ Zero} = |U_S + U_R|$.

Preferably, the step of calculating a system accuracy with a system logic comprises the step of calculating a process temperature-corrected system accuracy, $A_{Process}$, wherein $$A_{Process} = \frac{S_{0_S} + (A_S C_S)}{C_{FC}} + \frac{S_{0_R} + (A_R C_R)}{C_{FC}},$$

and wherein $C_{FC}$ is a fuel consumption conversion factor.

Preferably, the method for determining system accuracy comprises the step of providing a notification if at least one of a system parameter and hardware specification is incompatible with at least one predefined rule.

Preferably, the method for determining system accuracy comprises the steps of: generating suggested hardware specifications related to the supply flowmeter from the system parameters inputted; and generating suggested hardware specifications related to the return flowmeter from the system parameters inputted.

According to an aspect, a system for configuring a metering system is provided. The system for configuring a metering system comprises at least two flowmeters. The system also comprises a computing device configured to receive at least one input and to generate at least one output, wherein the at least one input comprises at least one flowmeter hardware specification and at least one system parameter. System logic with the computing device is configured to calculate the at least one output, wherein the at least one output comprises at least one of a system accuracy and a temperature-corrected system accuracy.

Preferably, at least one hardware specification comprises a base accuracy value.

Preferably, at least one hardware specification comprises a zero offset value.

Preferably, at least one hardware specification comprises a temperature drift value.

Preferably, at least one hardware specification comprises a maximum flow rate value.

Preferably, at least one system parameter comprises a zero calibration temperature value.

Preferably, at least one system parameter comprises a fluid density.

Preferably, at least one system parameter comprises an inlet temperature and an outlet temperature.

Preferably, at least one fuel system accuracy metric comprises a system accuracy.

Preferably, the system accuracy comprises $A_{Factory\ Zero}$, wherein $A_{Factory\ Zero} = |U_S + U_R|$, and wherein:
$U_S = T_{D_S} m_{max_S} |(T_{inlet} - T_0)| S_{0_S} + (A_S C_S)$;
$T_{D_S}$ is a temperature drift of supply flowmeter;
$m_{max_S}$ is a maximum supply flowmeter flow rate;
$T_{inlet}$ is an inlet temperature;
$T_0$ is a zero calibration temperature;
$S_{0_S}$ is a zero offset of supply flowmeter;
$A_S$ is a base accuracy of supply flowmeter;
$C_S$ is a supply flow rate conversion factor;
$U_R = T_{D_R} m_{max_R} |(T_{outlet} - T_0)| S_{0_R} + (A_R C_R)$;
$T_{D_R}$ is a temperature drift of return flowmeter;
$m_{max_R}$ is a maximum return flowmeter flow rate;
$T_{outlet}$ is an outlet temperature;
$T_0$ is a zero calibration temperature;
$S_{0_R}$ is a zero offset of return flowmeter;
$A_R$ is a base accuracy of return flowmeter; and
$C_R$ is a return flow rate conversion factor.

Preferably, the temperature-corrected system accuracy comprises $A_{Process}$, wherein $$A_{Process} = \frac{S_{0_S} + (A_S C_S)}{C_{FC}} + \frac{S_{0_R} + (A_R C_R)}{C_{FC}},$$

and wherein:
$S_{0_S}$ is a zero offset of supply flowmeter;
$A_S$ is a base accuracy of supply flowmeter;

$C_S$ is a supply flow rate conversion factor;
$S_{0_R}$ is a zero offset of return flowmeter;
$A_R$ is a base accuracy of return flowmeter;
$C_R$ is a return flow rate conversion factor; and
$C_{FC}$ is a fuel consumption conversion factor.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
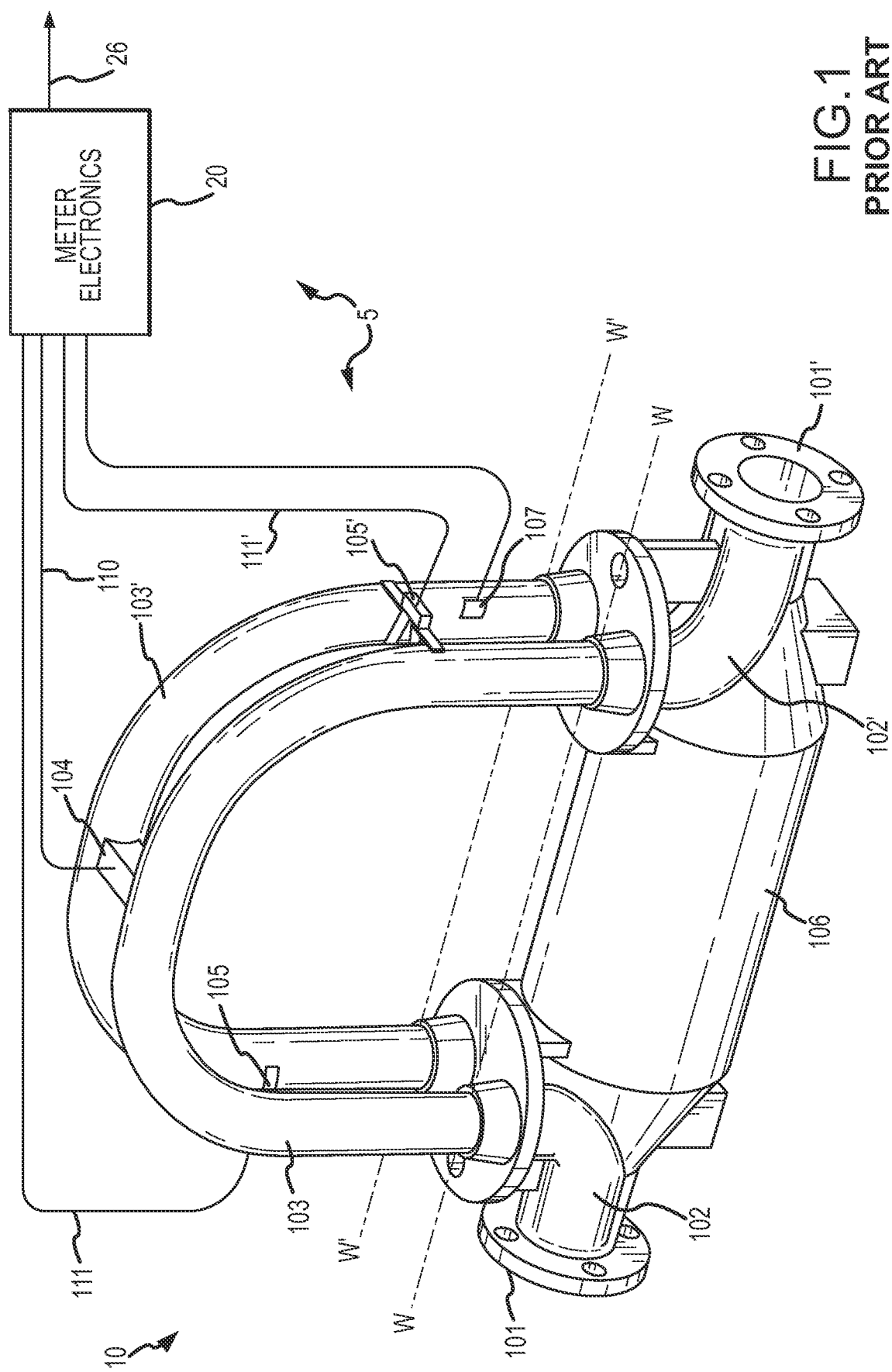
FIG. 1 shows a prior art vibrating sensor assembly.

FIG. 1 illustrates an example of a prior art flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, mass flow rate, volume flow rate, totalized mass flow, temperature, and other information.

The sensor assembly 10 includes a pair of flanges 101 and 101', manifolds 102 and 102', and conduits 103 and 103'. Manifolds 102, 102' are affixed to opposing ends of the conduits 103, 103'. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103 and 103'. The conduits 103 and 103' extend outwardly from the manifolds in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103 and 103', flows through conduits 103 and 103' and back into outlet manifold 102' where it exits the sensor assembly 10 through the flange 101'.

The sensor assembly 10 includes a driver 104. The driver 104 is affixed to conduits 103 and 103' in a position where the driver 104 can vibrate the conduits 103, 103' in the drive mode. More particularly, the driver 104 includes a first driver component (not shown) affixed to conduit 103 and a second driver component (not shown) affixed to conduit 103'. The driver 104 may comprise one of many well known arrangements, such as a magnet mounted to the conduit 103 and an opposing coil mounted to the conduit 103'.

In the present example, the drive mode is the first out-of-phase bending mode and the conduits 103 and 103' are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103 and 103' are driven by the driver 104 in opposite directions about their respective bending axes W-W and W'-W'. A drive signal in the form of an alternating current can be provided by one or more meter electronics 20, such as for example via pathway 110, and passed through the coil to cause both conduits 103, 103' to oscillate. Those of ordinary skill in the art will appreciate that other drive modes may be used within the scope of the present invention.

The sensor assembly 10 shown includes a pair of pickoffs 105, 105' that are affixed to conduits 103, 103'. More particularly, a first pickoff component (not shown) is located on conduit 103 and a second pickoff component (not shown) is located on conduit 103'. In the embodiment depicted, the pickoffs 105, 105' may be electromagnetic detectors, for example—pickoff magnets and pickoff coils that produce pickoff signals that represent the velocity and position of the conduits 103, 103'. For example, the pickoffs 105, 105' may supply pickoff signals to the one or more meter electronics 20 via pathways 111, 111'. Those of ordinary skill in the art will appreciate that the motion of the conduits 103, 103' is proportional to certain characteristics of the flowing material, for example, the mass flow rate and density of the material flowing through the conduits 103, 103'.

It should be appreciated that while the sensor assembly 10 described above comprises a dual flow conduit flowmeter, it is well within the scope of the present invention to implement a single conduit flowmeter. Furthermore, while the flow conduits 103, 103' are shown as comprising a curved flow conduit configuration, the present invention may be implemented with a flowmeter comprising a straight flow conduit configuration. It should also be appreciated that the pickoffs 105, 105' can comprise strain gages, optical sensors, laser sensors, or any other sensor type known in the art. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receive one or more signals, for example, from pickoffs 105, 105' and one or more temperature sensors 107, such as a resistive temperature device (RTD), and use this information to measure a characteristic of a flowing material.

Figure 2:
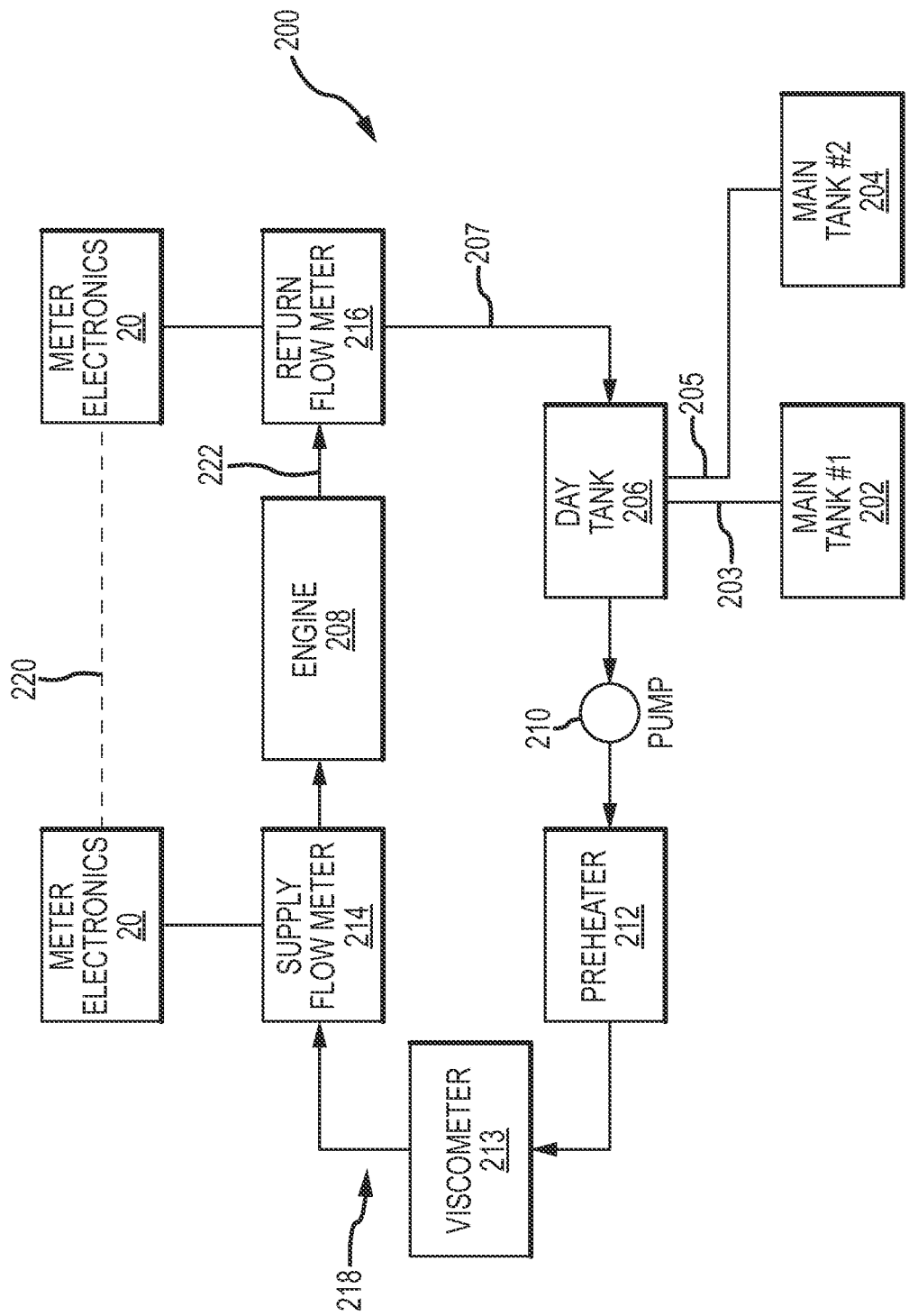
FIG. 2 shows a prior art fuel system.

FIG. 2 illustrates a prior art fuel system 200. The fuel system 200 is shown as a typical marine fuel system. This is merely an example of a multi-flowmeter system, and shall not serve to limit the claims or specification. Fuel is stored in main tanks 202, 204. In one example of an embodiment, heavy fuel oil (HFO) is stored in a first main tank 202, and marine diesel oil (MDO) is stored in a second main tank 204. The main tanks 202, 204 are fed into a day tank 206 through fuel lines 203 and 205, respectively. This is merely an example, and it should be clear that more than two main tanks may be present, or only one main tank may be present. The day tank 206 is typically sized to store a limited amount of fuel for safety and contamination purposes. The day tank 206 prevents too much fuel from being stored in an area, such as a ship's engine room, so to minimize fire or explosion risk. Should there be a fire, the limited fuel availability contributes to lower the severity of fire-related incidents. Additionally, the day tank 206 receives fuel that has been presented to an engine 208, but not utilized thereby, thus return fuel is routed back to the day tank 206 through a return fuel line 207. It should be appreciated that while the fuel system 200 only shows one fuel outlet 222 and two flowmeters 214, 216, in some embodiments there will be multiple fuel outlets and more than two flowmeters.

During operation, fuel is typically recirculated from the day tank 206 to the engine 208 or other fuel consuming device and whatever fuel is not consumed flows back to the day tank 206 in a closed loop circuit 218. Should the day tank 206 become low on fuel, fuel from a main tank 202, 204 replenishes the day tank 206. A pump 210 provides the action necessary to pump the fuel from the day tank 206 to the engine 208 and back. An inline preheater 212 heats the fuel to a temperature that is ideal for the fuel being utilized by the engine 208. For example, the operating temperature of HFO is generally between about 120-150° C., while MDO is ideally around 30-50° C. The appropriate temperature for a particular fuel allows the viscosity of the fuel to be controlled and kept in an ideal range. The kinematic viscosity of the fuel is a measure of the fluidity at a certain temperature. Since the viscosity of a fuel decreases with increasing temperature, the viscosity at the moment the fuel leaves the engine's fuel injectors (not shown) must be within a range dictated by the engine manufacturer in order to create an optimal fuel spray pattern. Viscosities that deviate from specifications lead to substandard combustion, power loss, and potentially deposit formation. The preheater 212, when set correctly for the particular fuel being used, allows for an optimal viscosity to be obtained.

In order to measure flow parameters, such as mass flow rate or density, for example, inline flowmeters are utilized. A supply-side flowmeter 214 is situated upstream of the engine 208, while a return-side flowmeter 216 is situated downstream of the engine 208. Since the engine 208 does not use all of the fuel provided to the engine in a common fuel rail system (not shown), excess fuel is recirculated through the day tank 206 and the closed loop circuit 218. Therefore, a single flowmeter would not provide accurate flow measurements, especially as related to engine fuel consumption, thus necessitating both supply 214 and return 216 flowmeters (upstream and downstream of the engine 208, respectively). The difference in flow rates measured by the flowmeters 214, 216 is substantially equal to the flow rate of the fuel being consumed by the engine 208. Therefore, the difference in the measured flow rates between the flowmeters 214, 216 is a predominant value of interest in most applications similar to the configuration shown in FIG. 2. It should be noted that a common rail fuel system serves only as an example, and does not limit the scope of the claimed invention. Other fuel systems wherein fuel is returned and/or recirculated are contemplated.

When operating large engines, knowing the inlet and outlet condition of the system is critical to the efficiency and performance. Most engine systems, such as that illustrated in FIG. 2, have a fuel conditioning system that is used to prepare the fuel to a specific viscosity, temperature, and consistency before it enters the engine, such as a preheater 212. Having the correct fuel condition can drastically impact the engine's performance. A viscometer 213 downstream of the preheater 212 measures fuel viscosity, and in some embodiments can communicate with the preheater 212 to adjust the preheater temperature such that the fuel remains within a predetermined viscosity range.

Meter electronics 20 can include an interface, digitizer, a processing system, internal memory, external memory, and a storage system. The meter electronics 20 can generate a drive signal and supply the drive signal to the driver 104. In addition, the meter electronics 20 can receive sensor signals from the flowmeters 214, 216, such as pickoff/velocity sensor signals, strain signals, optical signals, temperature signals, or any other signals known in the art. In some embodiments, the sensor signals can be received from the pickoffs 105, 105'. The meter electronics 20 can operate as a densitometer or can operate as a mass flowmeter, including operating as a Coriolis flowmeter. It should be appreciated that the meter electronics 20 may also operate as some other type of sensor assembly and the particular examples provided should not limit the scope of the present invention. The meter electronics 20 can process the sensor signals in order to obtain flow characteristics of the material flowing through the flow conduits 103, 103'. In some embodiments, the meter electronics 20 may receive a temperature signal from one or more RTD sensors or other temperature sensors 107, for example.

Meter electronics 20 can receive sensor signals from the driver 104 or pickoffs 105, 105', via leads 110, 111, 111'. The meter electronics 20 may perform any necessary or desired signal conditioning, such as any manner of formatting, amplification, buffering, etc. Alternatively, some or all of the signal conditioning can be performed in the processing system. In addition, an interface 220 can enable communications between the meter electronics 20 and external devices and additional meter electronics 20. The interface can be capable of any manner of electronic, optical, or wireless communication.

The meter electronics 20 in one embodiment can include a digitizer, wherein a sensor signal comprises an analog sensor signal. The digitizer can sample and digitize the analog sensor signal and produce a digital sensor signal. The digitizer can also perform any needed decimation, wherein the digital sensor signal is decimated in order to reduce the amount of signal processing needed and to reduce the processing time.

The meter electronics 20 may comprise a processing system that can conduct operations of the meter electronics 20 and process flow measurements from the sensor assembly 10. The processing system can execute one or more processing routines, such as a zero consumption capture routine, a differential zero determination routine, a general operating routine, and fuel type signal routine, for example, and thereby process the flow measurements in order to produce one or more flow measurements.

The processing system can comprise a general purpose computer, a micro-processing system, a logic circuit, or some other general purpose or customized processing device. The processing system can be distributed among multiple processing devices. The processing system can include any manner of integral or independent electronic storage medium. The processing system processes sensor signals in order to generate the drive signal, among other things. The drive signal is supplied to the driver 104 in order to vibrate the associated conduit(s), such as the conduits 103, 103' of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As the processing system generates the various flow characteristics, such as for example, the mass flow rate or volume flow rate, an error may be associated with the generated flow rate due to the zero offset of the vibrating flowmeter, and more particularly, a change or a drift in zero offset of the vibrating flowmeter. The zero offset can drift away from an initially calculated value due to a number of factors including a change in one or more operating conditions—especially the temperature of the vibrating flowmeter. The change in temperature may be due to a change in the fluid temperature, the ambient temperature, or both. In the fuel system 200, the preheater 212 is predominantly responsible for the temperature of the fluid that the flowmeters 214, 216 experience. The change in temperature will likely deviate from a reference or calibration temperature of the sensor during the determination of the initial zero offset. According to an embodiment, the meter electronics 20 can correct for such drift.

Figure 3:
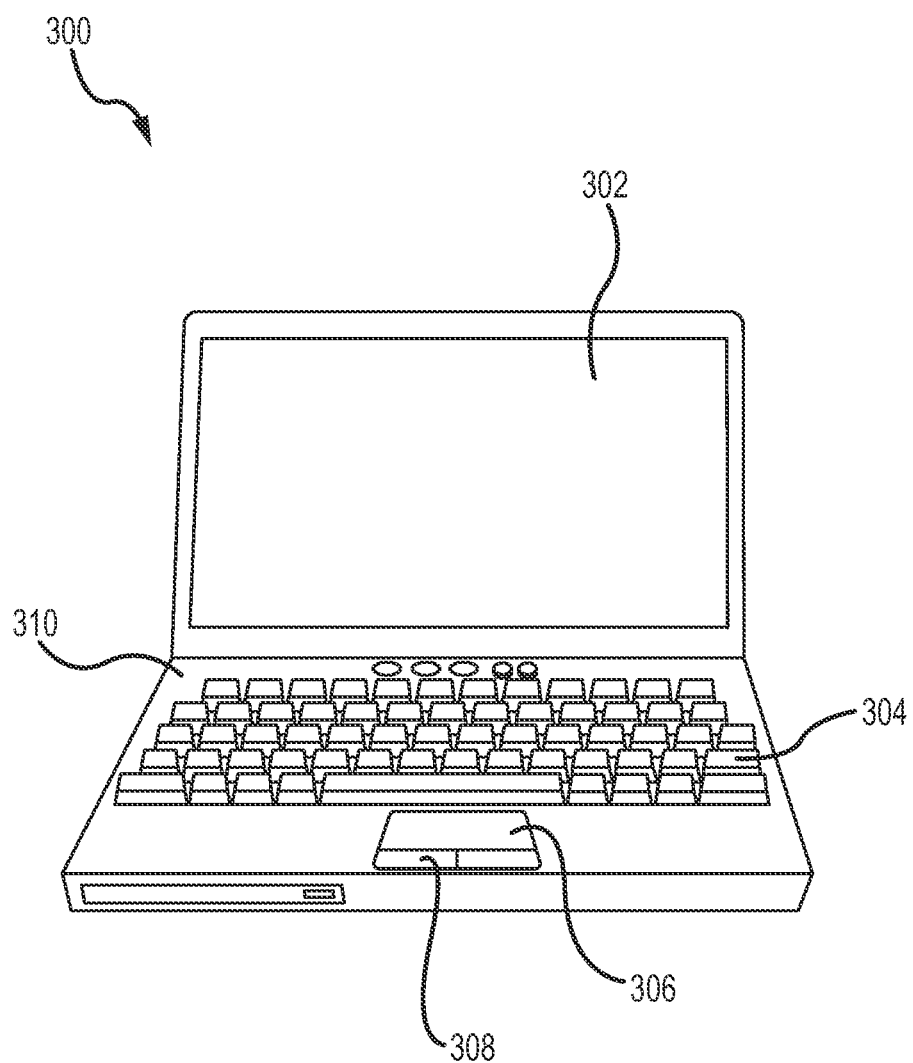
FIG. 3 shows a computing device according to an embodiment of the invention.

As described in detail below, embodiments of systems and methods for calculating optimal differential flowmeter system accuracy according to embodiments of the present invention are particularly suited for implementation in conjunction with a computing device 300. FIG. 3 is a simplified diagram of a computing device 300 for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer, or a remote terminal in a client server/relationship. Embodiments can also be implemented as stand-alone devices such as laptop computers, tablet computing devices, smart phones, dedicated computing hardware, and meter electronics 20 for example without limitation.

FIG. 3 shows computing device 300 including display device 302, keyboard 304, and track-pad 306. Trackpad 306 and keyboard 304 are representative examples of input devices, and could be any input device, such as a touch screen, mouse, roller ball, bar code scanner, microphone, etc. The trackpad 306 has neighboring buttons 308 for selection of items on a graphical user interface device (GUI), which is displayed on the display device 302. FIG. 3 is representative of but one type of system for embodying the present invention. It will be readily apparent to one of ordinary skill in the art that many system types and configurations are suitable for use in conjunction with the present invention. In one embodiment, the computing system comprises an operating system, such as Windows, Mac OS, BSD, UNIX, Linux, Android, iOS, etc. However, the apparatus is easily adapted to other operating systems and architectures by those of ordinary skill in the art without departing from the scope of the present invention.

The computing device may comprise a housing 310 that contains computer components such as a central processing unit, co-processor, video processor, input/output (I/O) interfaces, network and communication interfaces, disk drives, storage devices, etc. Storage devices include, but are not limited to, optical drives/media, magnetic drives/media, solid-state memory, volatile memory, networked storage, cloud storage, etc. The I/O interfaces comprise serial ports, parallel ports, USB ports, IEEE 1394 ports, etc. The I/O interfaces communicate with peripherals such as printers, scanners, modems, local area networks, wide area networks, virtual private networks, external storage and memory, additional computing devices 300, flowmeters 5, etc. One of ordinary skill in the art will recognize other variations, modifications, and alternatives.

The above system components may communicate with each other and control the execution of instructions from system memory or the storage devices, as well as the exchange of information between computer subsystems. Other arrangements of subsystems and interconnections are readily achievable by those of ordinary skill in the art.

Figure 4:
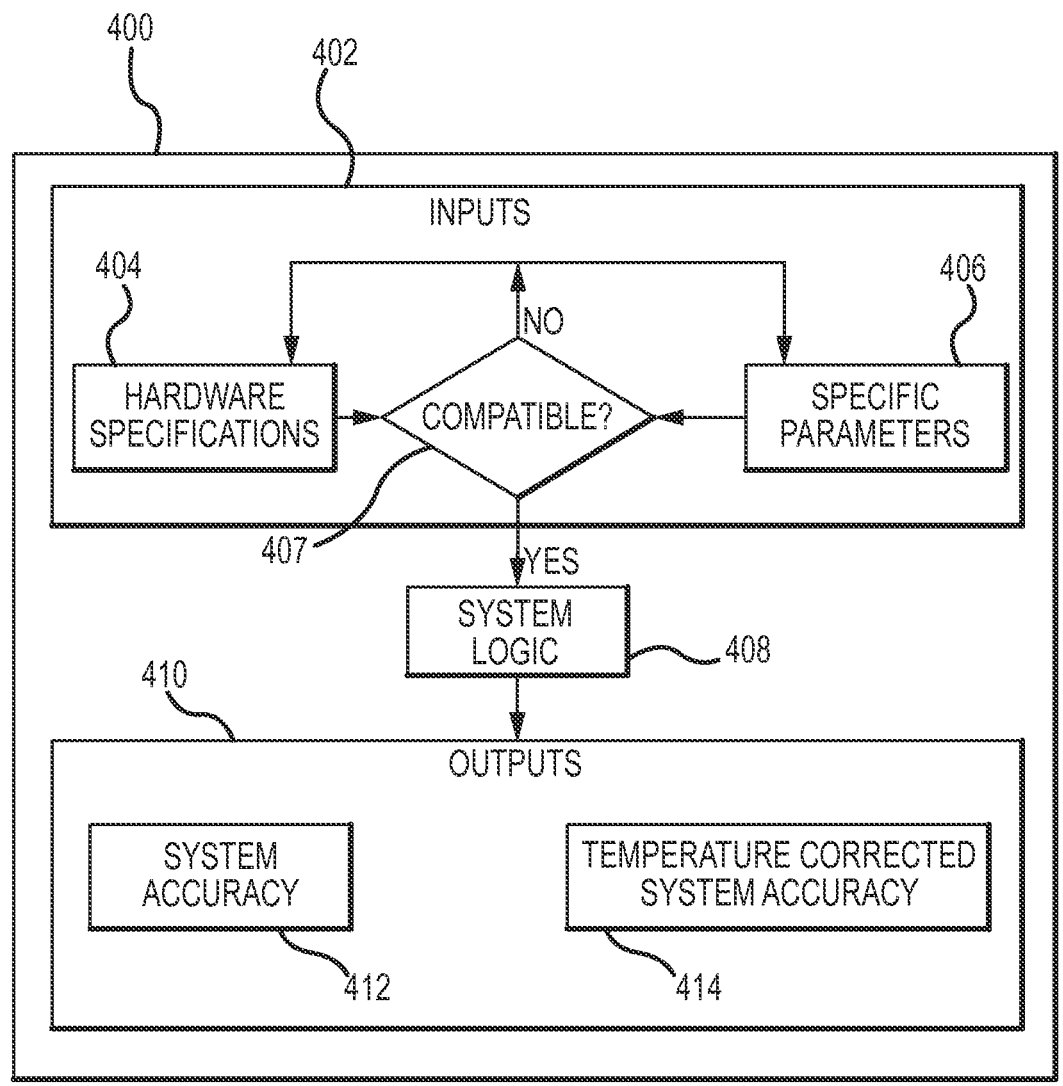
FIG. 4 shows a system for configuring a fluid consumption system according to an embodiment of the invention.

FIG. 4 is an overview diagram of an embodiment of a computer-based system 400 for determining optimal operating parameters for a differential flowmeter system according to an embodiment. Some embodiments of the system 400 may process inputs 402 in the form of data comprising hardware specifications 404 and system parameters 406. The inputs 402 are processed by the system logic 408 to produce outputs 410 comprising a system accuracy 412 and a temperature-corrected system accuracy 414, for example.

The system logic 408 processes the inputs 402, but before processing takes place, any number of compatibility rules 407 may be present that serve to constrain inputs such that appropriate inputs are received and appropriate outputs are generated. When system parameters 406 and hardware specifications 404 are input into the computing device, compatibility rules 407 verify that the inputs 402 are compatible with predefined rules. This ensures that the hardware chosen for a particular fuel system 200 will function properly/efficiently and not create any dangerous or inherently inaccurate fuel system configurations. Other rules include restrictions on relative flowmeter sizing. For example, in an embodiment the return flowmeter 216 cannot be larger than the supply flowmeter 214. In an embodiment, the return flow rate cannot be a value larger than the supply flow rate. In an embodiment, the inlet temperature 604 cannot be higher than the outlet temperature 606 in the case of a fuel system 200. In an embodiment, the fluid density 602 cannot exceed the density of fluid permitted through a chosen flowmeter. These are merely examples of rules that may be employed, and other rules are contemplated to be within the scope of this specification and claims. In an embodiment, some rules serve to provide flags or warnings to indicate potential, yet not absolute, issues. These rules may simply warn of potential incompatibilities, yet will still allow the system 400 to process such inputs 402.

The system logic 408 processes the inputs 402 and, in an embodiment, any associated factors. The associated factors comprise other sources of data in machine-readable form that are related to the inputs, which may be created during or after the processing of inputs, constants, intermediate values, etc. The system logic 408 executes a series of steps, algorithms, and/or equations utilizing the inputs 402 and any associated factors. In one embodiment, code present on a computer-readable storage medium may instruct a processor to receive inputs 402 and generate outputs 410. As indicated in FIG. 4, code may direct the processor to process the inputs 402 through the system logic 408, and calculate outputs 410, such as embodiments of system accuracy 412, 414.

Figure 5:
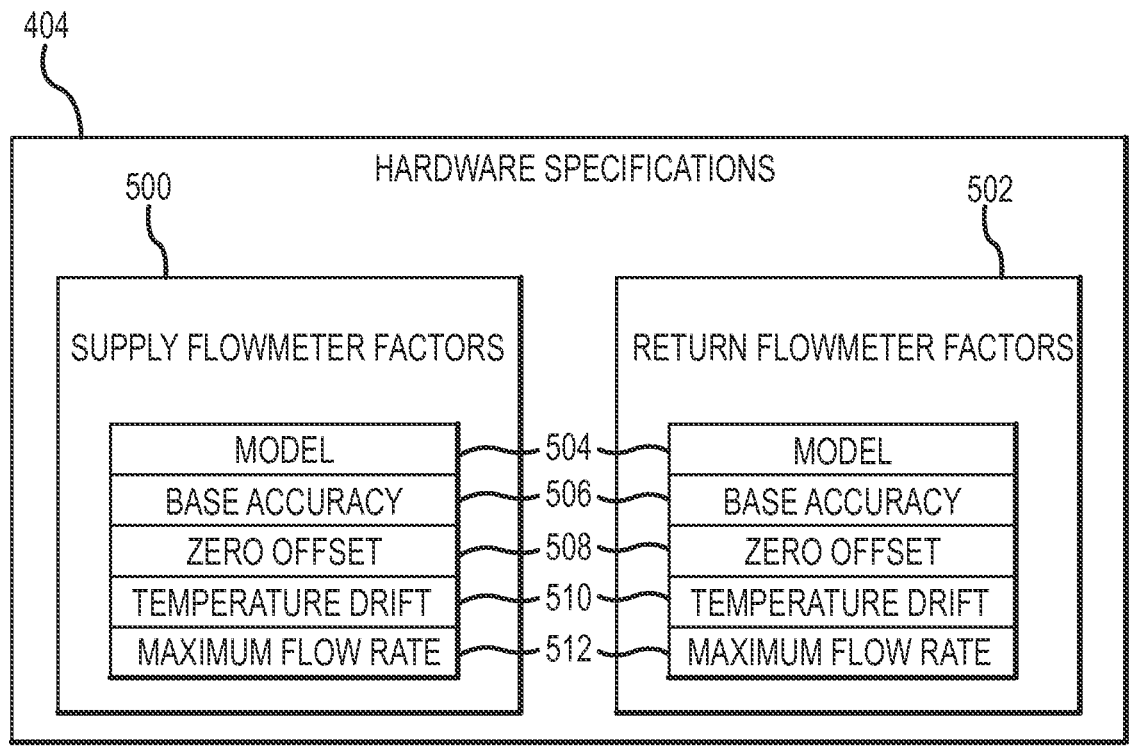
FIG. 5 shows hardware specifications according to an embodiment of the invention.

FIG. 5 is a diagram illustrating the hardware specifications 404 that serve as inputs 402 to the system 400. The hardware specifications 404 are factors/variables related to the flowmeters employed in a particular system. In the example provided, two flowmeters are utilized, so the hardware specifications 404 comprise supply flowmeter factors 500 and return flowmeter factors 502. Such factors include the model 504, the base accuracy 506 of each meter, the zero offset 508 of each meter, the temperature drift of each meter 510, and the maximum flow rate 512 of each meter. Note that none of these factors need be the same nor different between the supply flowmeter 214 and return flowmeter 216. The model 504 is the identifier for a particular flowmeter having a particular set of associated attributes. For example, without limitation, a "Micro Motion F025" flowmeter is a Coriolis mass flowmeter that can accept a line size of ¼" to ½" and can receive a fluid flow of 100 lb/min. Other qualities associated with this particular model, by way of example, are shown in Table 1:

TABLE 1

| | |
|---|---|
| Mass flow accuracy | +/−0.10% to 0.20% of flow rate |
| Volume flow accuracy | +/−0.15% to 0.30% of flow rate |
| Gas flow accuracy | +/−0.50% of flow rate |
| Density accuracy | +/−0.001 to 0.002 g/cc (+/1.0 to 2.0 kg/m³) |
| Wetted parts | Stainless Steel 316L or Nickel Alloy C-22 |
| Temperature rating | Standard: −150° to 400° F. (−100° to 204° C.) High Temperature: −40° to 662° F. (−40° to 350° C.) |
| Pressure rating | 1450 psi (100 bar) Stainless Steel 316L 2160 psi (148 bar) Nickel Alloy C-22 |

The base accuracy 506 of the flowmeters 214, 216 is the error rate associated with the particular flowmeter being used in an application. The base accuracy 506 is typically a specified user option and may be an error that ranges, for example, from about 0.05% to 0.5% of the flow rate, depending on the particular fluid passing through the meter, the particular flow metric measured, and the level of accuracy inherent in the flowmeter.

The zero offset 508, or zero stability, is a metric, preferably measured in units of lbs/min, to indicate the flow registered by a flowmeter when there is zero flow through the conduits 103, 103'. Generally, a flowmeter 5 is initially calibrated at the factory to generate a zero offset figure. In use, a flow calibration factor is typically multiplied by a time delay measured by the pickoffs minus the zero offset 508 to generate a mass flow rate. In most situations, the flowmeter 5 is initially calibrated and assumed to provide accurate measurements without subsequent calibrations required. Although this initially-determined zero offset 508 can adequately correct the measurements in a number of circumstances, the zero offset 508 may change over time due to changes in a variety of operating conditions, including temperature, resulting in only partial corrections. However, other operating conditions may also affect the zero offset 508, including pressure, fluid density, sensor mounting conditions, etc. Furthermore, the zero offset 508 may change at a different rate from one meter to another. This may be of particular interest in situations where more than one meter is connected in series such that each of the meters should read the same value if the same fluid flow is being measured. In an embodiment, the zero offset 508 is a fixed value. In another embodiment, a plurality of zero offsets 508 are stored in memory, and the appropriate zero offset 508 is applied to calculations based on the process temperature, the difference in temperature between the flowmeters 214, 216, pressure, fluid density, and/or sensor mounting conditions.

The temperature drift 510 is the known rate of accuracy drift that occurs as a flowmeter deviates away from the temperature in which the factory zero calibration occurred. The temperature drift 510 is measured as a percentage of the maximum flow rate 512 of a particular flowmeter. The maximum flow rate 512 is simply the greatest rate of flow that a particular flowmeter can accurately measure.

Figure 6:
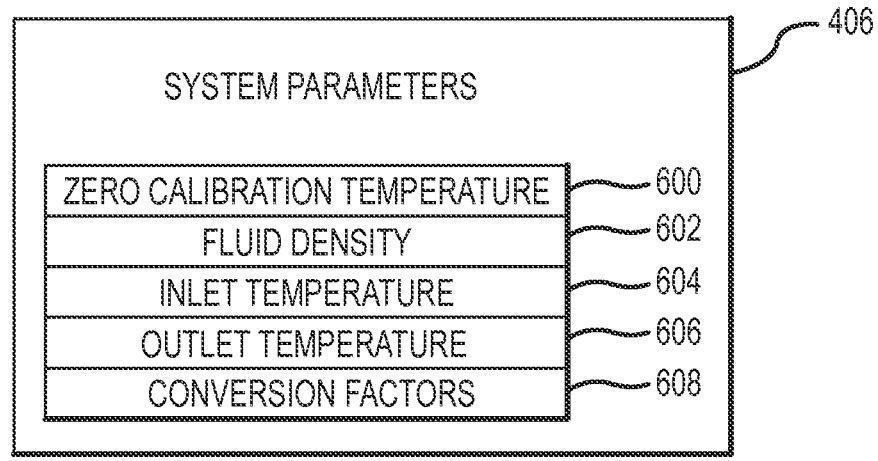
FIG. 6 shows system parameters according to an embodiment of the invention.

FIG. 6 is a diagram illustrating the system parameters 406 that serve as inputs 402 to the system 400. The system parameters 406 are factors/variables related to the system 400 in which flowmeters are to be integrated. In the example provided, two flowmeters are utilized, one termed the supply flowmeter 214, which is situated upstream of an engine 208, as well as a return flowmeter 216, which is situated downstream of the engine 208. The zero calibration temperature 600 is the temperature at which each flowmeter 214, 216 was calibrated, either by an end user or at the factory. Fluid density 602 is the density of the fluid being utilized by the fuel system 200, preferably measured as g/cc. In an embodiment, simply inputting the type of fuel utilized and the process temperature will calculate the fluid density 602 by accessing a look-up table containing relevant fuel data. In an embodiment, a user may manually enter the fluid density 602. The inlet temperature 604 is the known temperature of the fluid immediately prior to entering the supply flowmeter 214, while the outlet temperature 606 is the temperature of the fluid immediately prior to entering the return flowmeter 216. These temperatures may correspond to a flowmeter temperature or a meter electronics temperature, for example. Lastly, conversion factors 608 refer to any factors or constants utilized by equations or algorithms of the system 400. Some examples of conversion factors 608 include, without limitation, constants that convert or adapt metric values to United States customary units and/or visa-versa.

System logic 408 computes any series of steps, algorithms, and/or equations and performs executables, utilizing the inputs 402 and any associated factors in order to generate outputs 410, such as system accuracy 412, 414. In an embodiment, the system logic 408 calculates supply flowmeter uncertainty. Supply flowmeter uncertainty, according to an embodiment is calculated according to Equation (1):

$$U_S = T_{D_S} m_{max_S} |(T_{inlet} - T_0)| + S_{0_S} + (A_S C_S) \quad (1)$$

Where:
$U_S$=Supply flowmeter uncertainty
$T_{D_S}$=Temperature drift of supply flowmeter
$m_{max_S}$=Maximum supply flowmeter flow rate
$T_{inlet}$=Inlet temperature
$T_0$=Zero calibration temperature
$S_{0_S}$=Zero offset of supply flowmeter
$A_S$=Base accuracy of supply flowmeter
$C_S$=Supply flow rate conversion factor As noted above, the temperature drift 510, maximum supply flowmeter flow rate 512, zero offset of the supply flowmeter 508, and base accuracy of the supply flowmeter 506 are supply flowmeter factors 500 inputted into the system 400. The inlet temperature 604 is a system parameter 406 inputted into the system 400. The supply flow rate conversion factor is a conversion factor 608.

Similarly, return flowmeter uncertainty is, in an embodiment, calculated in system logic 408 according to Equation (2):

$$U_R = T_{D_R} m_{max_R} |(T_{outlet} - T_0)| + S_{0_R} + (A_R C_R) \quad (2)$$

Where:
$U_R$=Return flowmeter uncertainty
$T_{D_R}$=Temperature drift of return flowmeter
$m_{max_R}$=Maximum return flowmeter flow rate
$T_{outlet}$=Outlet temperature
$T_0$=Zero calibration temperature
$S_{0_R}$=Zero offset of return flowmeter
$A_R$=Base accuracy of return flowmeter
$C_R$=Return flow rate conversion factor According to an embodiment, system accuracy 412 is calculated in system logic 408 according to Equation (3). This embodiment reflects the uncertainty in total differential measurements that relies on factory zeroing.

$$A_{Factory\ Zero} = |U_S + U_R| \quad (3)$$

Where:
$A_{Factory\ Zero}$=Total differential measurement accuracy calculated with a factory zero According to an embodiment, temperature-corrected system accuracy 414 is calculated in system logic 408 according to Equation (4). This embodiment reflects the uncertainty in total differential measurements that rely on zeroing at process temperature.

$$A_{Process} = \frac{S_{0_S} + (A_S C_S)}{C_{FC}} + \frac{S_{0_R} + (A_R C_R)}{C_{FC}} \quad (4)$$

Where:
$A_{Process}$=Total differential measurement accuracy calculated at process temperature
$S_{0_S}$=Zero stability of supply flowmeter
$A_S$=Base Accuracy of supply flowmeter
$C_S$=Supply flow rate conversion factor
$S_{0_R}$=Zero offset of return flowmeter
$A_R$=Base Accuracy of return flowmeter
$C_R$=Return flow rate conversion factor
$C_{FC}$=Fuel Consumption conversion factor Equations (3) and (4) serve merely as examples used to calculate the accuracy of a multi-flowmeter system having two flowmeters in series, and shall not limit the claims or specification in any way. Alternative equations and algorithms are contemplated.

One such alternate example is embodied by Equation (5) wherein differential meter accuracy is determined by the system logic 408 using a root sum square analysis:

$$A_{RSS} = \frac{\sqrt{((m_{inlet} - (m_{inlet} A_S))^2 + (m_{outlet} - (m_{outlet} A_R))^2)}}{100} \quad (5)$$

Figure 7:
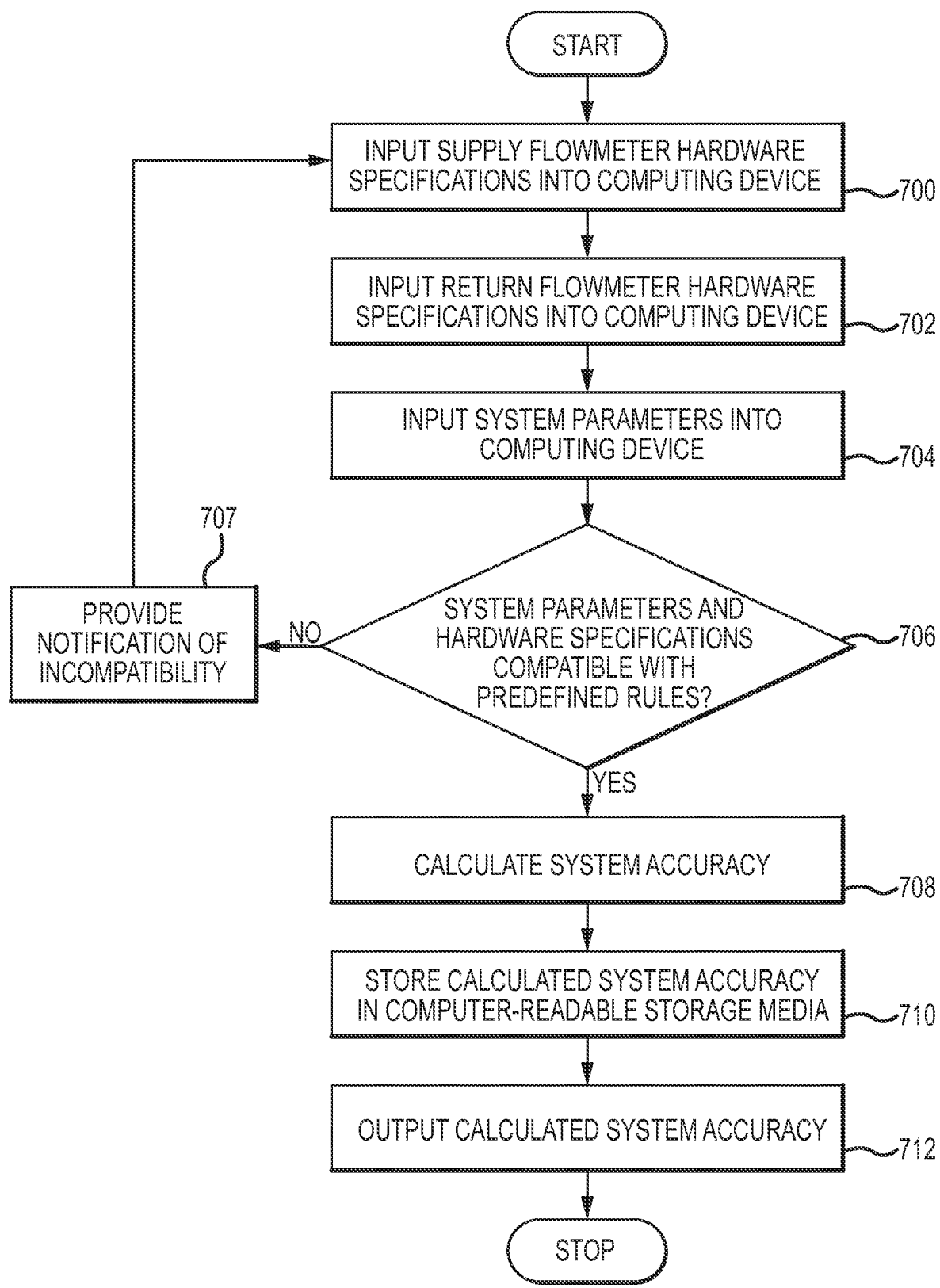
FIG. 7 is a flow chart describing a method for configuring a fluid consumption system according to an embodiment of the invention.

Where:
$A_{RSS}$=Accuracy by Root Sum Square
$m_{inlet}$=Flow rate before engine
$m_{outlet}$=Flow rate after engine
$A_S$=Base Accuracy of supply flowmeter
$A_R$=Base Accuracy of return flowmeter FIG. 7 is a flow chart illustrating an embodiment of a method of configuring a fluid consumption system having at least two flowmeters that are designed to provide a differential measurement, such as fluid consumption for example. The first steps comprise inputting data into a computing device 300. In particular, hardware specifications 404 related to the supply flowmeter 214 are input into the computing device 300 in step 700. Similarly, hardware specifications 404 related to the return flowmeter 216 are input into the computing device 300 in step 702. As noted above, the hardware specifications may comprise at least such factors as the model 504, the base accuracy 506 of each meter, the zero offset 508 of each meter, the temperature drift of each meter 510, and the maximum flow rate 512 of each meter. Other specifications may also be input in steps 700 and 702, and those listed serve only as examples, without limitation, of the potential specifications.

In step 704, system parameters 406 are input into the computing device 300. Such parameters include a zero calibration temperature 600, fluid density 602, inlet temperature 604, which is the temperature of the fluid immediately prior to entering the return flowmeter 216, outlet temperature 606, and any conversion factors 608. Other system parameters 406 may also be input in step 704, and those listed serve only as examples, without limitation, of the potential inputs. In an embodiment, the computing device 300 calculates and recommends particular flowmeter models or specifications based upon the system parameters input in step 704. In this embodiment, step 704 is performed before steps 700 and 702, and the flowmeter hardware specifications 404 are generated and suggested by the computing device. In one embodiment, these suggested hardware specifications 404 are automatically input into the computing device 300.

A number of rules may be present with the system, stored in memory or computer-readable media, for example. Such rules serve to constrain inputs and outputs such that appropriate inputs are received and appropriate outputs are generated. For example, a fuel system 200 having a maximum mass flow of fluid into the supply flowmeter 214 of 200 lb/min would not be compatible with a supply flowmeter 214 having a maximum flow rate of only 100 lb/min. Therefore, when system parameters 406 and hardware specifications 404 are input into the computing device in steps 700, 702, and 704, the next step, step 706, verifies that the inputs 402 are compatible with predefined rules. Thus, in the above example, the fuel system 200 has a flow that exceeds the capacity of the chosen supply flowmeter 214, so a notification is generated in step 707. After the notification is generated, the system 400 prompts the user to re-enter the incompatible input. These steps 706, 707 ensure that the hardware chosen for a particular fuel system 200 will function properly/efficiently and not create any dangerous or inherently inaccurate fuel system configurations. Other rules include restrictions on relative flowmeter sizing. In an embodiment, the return flowmeter 216 cannot be larger than the supply flowmeter 214. In an embodiment, the return flow rate cannot be a value larger than the supply flow rate. In an embodiment, the inlet temperature 604 cannot be higher than the outlet temperature 606 in the case of a fuel system 200. In an embodiment, the fluid density 602 cannot exceed the density of fluid permitted through a chosen flowmeter. These are merely examples of rules that are checked in step 706, and other rules are contemplated to be within the scope of this specification and claims. In an embodiment, some rules serve to provide flags or warnings to indicate potential, yet not absolute, issues. These rules may simply warn of potential incompatibilities, yet will still allow the system 400 to process such inputs 402.

If the inputs 402 are compatible with each other and any other constraints, the system logic 408 calculates outputs 410, such as system accuracy 412, 414 in step 708. In this step, system logic 408 may use any inputs, stored information, and/or constants to calculate any number of intermediate values or final output values. An example of an intermediate value is supply flowmeter uncertainty. In an embodiment, supply flowmeter uncertainty is calculated according to Equation (1): $U_S = T_{D_S} m_{max_S} |(T_{inlet} - T_0)| + S_{0_S} + (A_S C_S)$. Another example of an intermediate value is return flowmeter uncertainty. Outputs such as system accuracy 412, temperature-corrected system accuracy 414, and accuracy by root sum square are calculated by system logic 408 in this step as well. In an embodiment, system accuracy 412, temperature-corrected system accuracy 414, and accuracy by root sum square are calculated using Equations (3), (4), and (5), respectively.

In step 710 system accuracy 412, 414, along with any other output 410, is stored in memory or computer-readable storage media. These values may then be outputted in step 712. Output generally means, for example, that a user is informed of calculated values via a display device 302 or that a peripheral such as a printer prints calculated values or that a user is emailed calculated values.

The present invention as described above provides various methods to calculate accuracy in multi vibrating flowmeter systems that employ meters such as a Coriolis flowmeter. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

We claim:

1. A method for determining an optimized flow system, comprising the steps of:
   inputting hardware specifications related to a plurality of supply flowmeters including a supply flowmeter into a computing device;
   inputting hardware specifications related to a plurality of return flowmeters including a return flowmeter into the computing device;
   determining whether a user inputs at least one of a system parameter and hardware specification that is incompatible with at least one predefined rule, wherein the at least one predefined rule is based on one or more of at least one of the hardware specifications related to the supply flowmeter and at least one of the hardware specifications related to the return flowmeter;
   generating a notification if a user inputs at least one of a system parameter and hardware specification that is incompatible with the at least one predefined rule;
   inputting system parameters into the computing device;
   calculating a supply flowmeter uncertainty based on one or more of the hardware specifications of the supply flowmeter;
   calculating a return flowmeter uncertainty based on one or more of the hardware specifications of the return flowmeter;
   calculating a system accuracy with a system logic, wherein the system logic utilizes the supply flowmeter uncertainty and the return flowmeter uncertainty to calculate the system accuracy, and wherein the system logic receives the inputs based on the hardware specifications related to the supply flowmeter, the hardware specifications related to the return flowmeter, and the system parameters, wherein the supply flowmeter uncertainty, $U_S$, equals $T_{D_S} m_{max_S} |(T_{inlet} - T_0)| + S_{0_S} + (A_S C_S)$, wherein:
   $T_{D_S}$ is a temperature drift of supply flowmeter;
   $m_{max_S}$ is a maximum supply flowmeter flow rate;
   $T_{inlet}$ is an inlet temperature;
   $T_0$ is a zero calibration temperature;
   $S_{0_S}$ is a zero offset of supply flowmeter;
   $A_S$ is a base accuracy of supply flowmeter; and
   $C_S$ is a supply flow rate conversion factor;
   calculating the return flowmeter uncertainty, $U_R$, wherein $U_R$ equals $T_{D_R} M_{max_R} |(T_{outlet} - T_0)| + S_{0_R} + (A_R C_R)$, wherein:
   $T_{D_R}$ is a temperature drift of return flowmeter;
   $m_{max_R}$ is a maximum return flowmeter flow rate;
   $T_{outlet}$ is an outlet temperature;
   $T_0$ is a zero calibration temperature;
   $S_{0_R}$ is a zero offset of return flowmeter;
   $A_R$ is a base accuracy of return flowmeter; and
   $C_R$ is a return flow rate conversion factor;
   storing the calculated system accuracy in a computer-readable storage media;
   outputting the calculated system accuracy; and
   optimizing hardware for a fluid consumption system having at least two flowmeters that are designed to provide a differential measurement, the optimizing accounting for the outputted calculated system accuracy and the determination of whether the user inputs the at least one of a system parameter and hardware specification that is incompatible with at least one predefined rule, wherein the at least two flowmeters comprise the supply flowmeter and the return flowmeter.

2. The method for determining system accuracy of claim 1, wherein the hardware specifications related to the supply flowmeter and the return flowmeter each comprise a base accuracy value.

3. The method for determining system accuracy of claim 1, wherein the hardware specifications related to the supply flowmeter and the return flowmeter each comprise a zero offset value.

4. The method for determining system accuracy of claim 1, wherein the hardware specifications related to the supply flowmeter and the return flowmeter each comprise a temperature drift value.

5. The method for determining system accuracy of claim 1, wherein the hardware specifications related to the supply flowmeter and the return flowmeter each comprise a maximum flow rate value.

6. The method for determining system accuracy of claim 1, wherein the system parameters comprise a zero calibration temperature value.

7. The method for determining system accuracy of claim 1, wherein the system parameters comprise a fluid density.

8. The method for determining system accuracy of claim 1, wherein the system parameters comprise an inlet temperature and an outlet temperature.

9. The method for determining system accuracy of claim 1, wherein the step of calculating a system accuracy with a system logic comprises the step of calculating a total differential measurement accuracy, $A_{Factory\ Zero}$, wherein $A_{Factory\ Zero} = |U_S + U_R 51|$.

10. The method for determining system accuracy of claim 1, wherein the step of calculating a system accuracy with a system logic comprises the step of calculating a process temperature-corrected system accuracy, $A_{Process}$, wherein $$A_{Process} = \frac{S_{0_S} + (A_S C_S)}{C_{FC}} + \frac{S_{0_R} + (A_R C_R)}{C_{FC}},$$

and wherein $C_{FC}$ is a fuel consumption conversion factor.

11. The method for determining system accuracy of claim 1, comprising the steps of:
generating suggested hardware specifications related to the supply flowmeter from the system parameters inputted; and
generating suggested hardware specifications related to the return flowmeter from the system parameters inputted.

12. A system for configuring a metering system comprising:
at least two flowmeters;
a computing device configured to receive at least one input from the at least two flowmeters and to generate at least one output, wherein the at least one input comprises at least one flowmeter hardware specification and at least one system parameter; and
system logic with the computing device configured to:
calculate the at least one output;
calculate a supply flowmeter uncertainty based on one or more of the at least one flowmeter hardware specification of the supply flowmeter;
calculate a return flowmeter uncertainty based on one or more of the at least one flowmeter hardware specification of the return flowmeter, wherein the at least one output comprises at least one of a system accuracy and a temperature-corrected system accuracy based upon the supply flowmeter uncertainty and the return flowmeter uncertainty;
determine whether a user inputs at least one of a system parameter and flowmeter hardware specification that is incompatible with at least one predefined rule, wherein the compliance with at least one predefined rule is determined using one or more of the at least one flowmeter hardware specification of the supply flowmeter and the at least one flowmeter hardware specification of the return flowmeter;
generate a notification if a user inputs at least one of a system parameter and flowmeter hardware specification that is incompatible with the at least one predefined rule; and
determine optimal operating parameters for the system using the outputted system accuracy and the determination whether a user inputs at least one of a system parameter and flowmeter hardware specification that is incompatible with the at least one predefined rule;

wherein the system accuracy comprises $A_{Factory\ Zero}$, wherein $A_{Factory\ Zero} = |U_S + U_R|$, and wherein the supply flowmeter uncertainty, $U_S = T_{D_S}\ m_{max_S}\ |(T_{inlet} - T_0)| + S_{0_S} + (A_S C_S)$ where:
$T_{D_S}$ is a temperature drift of supply flowmeter;
$m_{max_S}$ is a maximum supply flowmeter flow rate;
$T_{inlet}$ is an inlet temperature;
$T_0$ is a zero calibration temperature;
$S_{0_S}$ is a zero offset of supply flowmeter;
$A_S$ is a base accuracy of supply flowmeter;
$C_S$ is a supply flow rate conversion factor;
the return flowmeter uncertainty, $U_R = T_{D_R}\ m_{max_R}\ |(T_{outlet} - T_0)| + S_{0_R} + (A_R C_R)$, where:
$T_{D_R}$ is a temperature drift of return flowmeter;
$m_{max_R}$ is a maximum return flowmeter flow rate;
$T_{outlet}$ is an outlet temperature;
$T_0$ is a zero calibration temperature;
$S_{0_R}$ is a zero offset of return flowmeter;
$A_R$ is a base accuracy of return flowmeter; and
$C_R$ is a return flow rate conversion factor; and
wherein the system logic is further configured to calculate a total differential measurement accuracy, $A_{Factory\ Zero}$, wherein $A_{Factory\ Zero} = |U_S + U_R|$.

13. The system for configuring a metering system of claim 12, wherein the at least one hardware specification comprises a base accuracy value.

14. The system for configuring a metering system of claim 12, wherein the at least one hardware specification comprises a zero offset value.

15. The system for configuring a metering system of claim 12, wherein the at least one hardware specification comprises a temperature drift value.

16. The system for configuring a metering system of claim 12, wherein the at least one hardware specification comprises a maximum flow rate value.

17. The system for configuring a metering system of claim 12, wherein the at least one system parameter comprises a zero calibration temperature value.

18. The system for configuring a metering system of claim 12, wherein the at least one system parameter comprises a fluid density.

19. The system for configuring a metering system of claim 12, wherein the at least one system parameter comprises an inlet temperature and an outlet temperature.

20. The system for configuring a metering system of claim 12, wherein the at least one fuel system accuracy metric comprises a system accuracy.

21. The system for configuring a metering system of claim 12, wherein the temperature-corrected system accuracy comprises $A_{Process}$, wherein $$A_{Process} = \frac{S_{0_S} + (A_S C_S)}{C_{FC}} + \frac{S_{0_R} + (A_R C_R)}{C_{FC}},$$

and wherein:
$S_{0_S}$ is a zero offset of supply flowmeter;
$A_S$ is a base accuracy of supply flowmeter;
$C_S$ is a supply flow rate conversion factor;
$S_{0_R}$ is a zero offset of return flowmeter;
$A_R$ is a base accuracy of return flowmeter;
$C_R$ is a return flow rate conversion factor; and
$C_{FC}$ is a fuel consumption conversion factor.

* * * * *

UNITED STATES PATENT AND TRADEMARK OFFICE
CERTIFICATE OF CORRECTION

PATENT NO. : 10,663,338 B2  
APPLICATION NO. : 15/501759  
DATED : May 26, 2020  
INVENTOR(S) : Patrick John Zimmer and Steven M Jones Page 1 of 1

It is certified that error appears in the above-identified patent and that said Letters Patent is hereby corrected as shown below:

In the Claims

Column 16, Line 30, replace "$U_R \text{ equals } T_{D_R} M_{max_R}$" with -- $U_R \text{ equals } T_{D_R} m_{max_R}$ --.

Column 17, Line 13, replace "$|U_S + U_R 51$" with -- $|U_S + U_R|$ --.

Signed and Sealed this  
Tenth Day of November, 2020

Andrei Iancu  
*Director of the United States Patent and Trademark Office*